H. HESS.
GAGE.
APPLICATION FILED OCT. 18, 1910.
1,157,389.
Patented Oct. 19, 1915.
2 SHEETS—SHEET 1.
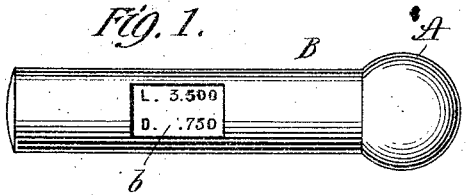
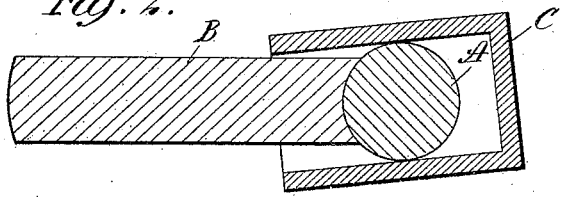
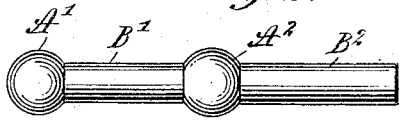
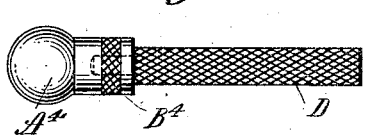
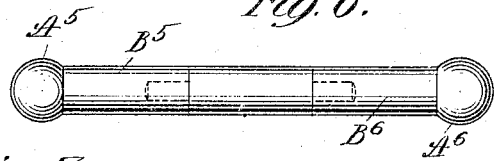
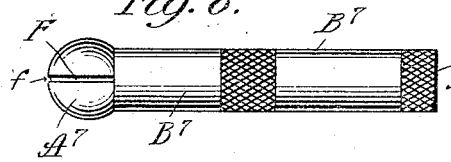
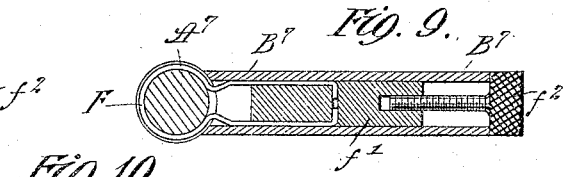
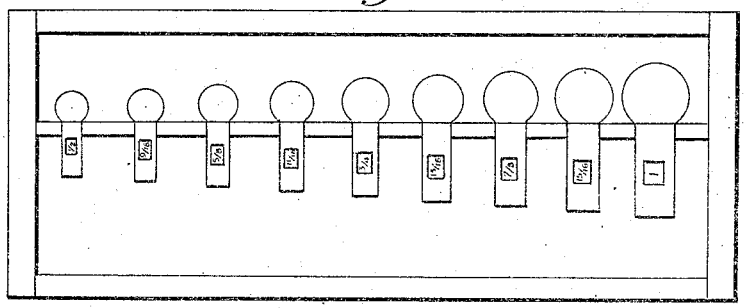
Witnesses:
Frank S. Ober
Elizabeth B. King
Inventor
Henry Hess
By his Attorneys, Rogers, Kennedy & Campbell - by Donald Campbell

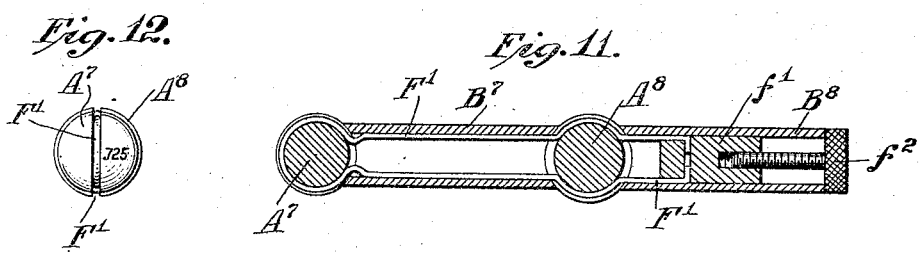

UNITED STATES PATENT OFFICE.

HENRY HESS, OF PHILADELPHIA, PENNSYLVANIA.

GAGE.

1,157,389.　　　Specification of Letters Patent.　　Patented Oct. 19, 1915.

Application filed October 18, 1910. Serial No. 587,702.

*To all whom it may concern:*

Be it known that I, HENRY HESS, a citizen of the United States, residing at Philadelphia, in the county of Philadelphia and State of Pennsylvania, have invented certain new and useful Improvements in Gages, of which the following is a specification, reference being had therein to the accompanying drawing.

My invention relates to gages, and by this term I do not refer broadly to all instruments for determining the trueness or mechanical objects, but only to those instruments for determining or measuring the size or dimension of objects. Gages with this understanding of the term, are of a great many types and for a great many uses, but for the purpose of the present application they may be considered as divided into two general classes, namely "fixed-dimension gages" and "changeable-dimension gages." The latter class is that in which the gaging surfaces are relatively movable over a considerable latitude so that the gage can be set to the dimension of the object, the size of which is thereupon indicated upon a scale usually a part of the gage.

The present invention relates more particularly to, and has its greatest field of usefulness in the other class, namely, that of fixed-dimension gages wherein in the practical use of the gage there is no adjustment of the gaging surfaces, the same being permanently set for a fixed size or dimension to which the object being gaged must accord in the use of the instrument.

Gages of the present invention are to have provided as an integral part of them preformed hardened steel balls, the gaging contacts consisting solely in portions of such balls; and such gages being preferably made or provided in complete sets of sizes, for example one gage for each difference of a sixteeenth of an inch within a given range.

Having premised this much with respect to the present invention, the said invention in its broad aspect may be said to consist of a gaging system for dimensions or sizes comprising a graduated set of gages, each consisting of a handle or support in combination with and having all its gaging parts consisting of one or more preformed spherical hardened steel balls, the said support and balls being connected together by immovable connections; and the said set of gages being graded to afford an increasing series of sizes either by the scientific sorting out and selection of individual balls as to their diameters, or by the scientific attachment of a plurality of such balls to each support at a certain exact distance from each other, or by both methods.

As one instance of the invention thus broadly stated the drawings hereof show as an embodiment thereof the kind of gage known as the plug or bore gage for determining the interior diameters of bores, the same taking different physical forms in the drawings; but the principles of the invention are also adapted to application in other kinds of gages, for example the so-called caliper gages either internal or external, or mixed gages, for example partly internal and partly external. And for each or any kind of gage the present invention may be applied with variations, such as, for example the variation from a single to a double gage or measure with a scientifically determined difference between the two so as to constitute of the instrument a so-called tolerance gage, with respect to which the object being measured must exceed the smaller measure and be under the larger measure to comply with the gage. In using the present invention I contempalte not only the employment of such variations as that just referred to, but also the addition of miscellaneous supplementary details, such for example as devices for originally standardizing or correcting the gages, for taking them apart, etc.

A gage or system of gages constructed in accordance with the above statement of the present invention affords a great many advantages with respect to both manufacture thereof and the use or practice thereof. For example, it will be appreciated that the employment of a spherical shape for all of gaging parts gives the very greatest accuracy of contact in measuring an object as to its internal or external diameter or otherwise. The actual part of the instrument which is in contact with the object is never a plane or an area, but is either one or more single points of contact, and theoretically these would be mathematical points, or at the most a single line of contact, said line being of inappreciable width. In no gage embodying my invention is it required to set or adjust a flat or plane area with respect to the object to be measured, and all the errors of such are thereby obviated.

With respect to the employment of preformed spherical hardened steel balls there is a great deal to say. Thus a ball possesses the advantage of maintaining its correctness of shape in a higher degree than other shapes. This is because all articles made of hardened steel are subject to change due to a change in the conditions of internal stress. A hardened steel object is internally strained in all directions due to voilent stresses produced in quenching the steel from a high temperature. In time these stresses relieve themselves with the result that the article somewhat changes its shape. The change will be the greater if the differences be greater in the internal strains in different sections of the object. Therefore the less uniform in shape an object is, the greater will be the change in shape due to the gradual release of these internal strains. Further the greater the departure of an object from uniformity of section, the greater will be the strains originally set up in quenching the high temperature. The sphere is the one shape which is uniform in every direction, and in which therefore the least internal strains will be set up by quenching, and in which further there will be the least change in shape by the gradual release of the internal strains. The hardness of these steel spheres is known to be superlative and the sphere may be made very much harder than any other shapes such as cylinders, rings, bars, etc. The sphere is also subject to very much less damage by direct nicking or indenting of its surface and by change of shape due to violent or improper treatment, as for example when the gage is carelessly allowed to fall upon a hard object. Besides these advantages the hardened steel spheres afford cheapness in the construction of the gage, which is a very considerable factor. The cheapness and accuracy of hardened steel spheres permit under my invention an entire system of gages to be constructed, the same of less cost to the user than that of a single gage of the heretofore well known adjustable type, such for example as the micrometer gage, which is in reality a machine, and one of great accuracy of workmanship, it being designed with moving parts enabling it to be set to correspond with the size of an object, whereupon such size is indicated upon the scale which also constitutes a part of the micrometer gage. With my invention employing the hardened steel balls, the latter are merely made, or selected by well known scientific methods in proper sizes, and an appropriate series of them selected to be made up into systems of gages; and by the word "system" I intend not only the graded set of balls and the means that supports them, but also the means for distinguishing them one from the other, such for example as the directions or indicating marks, which would preferably be figures showing the actual sizes, the same etched or otherwise applied upon the balls or their supports.

A system of gages made according to my invention is adapted not merely to be used as a standard of reference for other gages, but owing to the qualities hereinbefore and hereinafter referred to, the same are adapted to direct use by a workman in a shop.

I have already referred to that class of gages which may be termed "fixed-dimension gages" and have stated that the present invention has particular reference thereto. Indeed it is one of the great advantages of the present invention, as the same has been previously set forth, that it enables each gage to be a fixed-dimension gage, not only by the immovable connections of the spheres to their supports, but by the fixed, exact and unchangeable relation between the measuring points, parts or contacts of a given gage. Resulting from this in turn are many advantages of real practical value. Thus all mechanism is dispensed with and the instrument is purely and simply a gage and has none of the complications of a machine, to which objection the micrometer gage is open: there are no screws to be operated, and there is no adjustment or movement of parts in the employment of the gage. Indeed this will be seen to greatly enhance the convenience of the article, as the workman or his superior has merely to make a selection of the proper gage, and then he has in hand a solid thing of predetermined characteristics and with no possibility of error either in the adjustment thereof to the object to be measured or in the reading of the scale which pertains to it. Greater durability results not only because the wear involved is distributed over a great many individual gages, but also because of the entire absence of any wear due to movement or adjustment of screws or other parts. The simplicity of the immovable attachment of the steel spheres to their supports promotes the cheapness and therefore the availability of the invention, this being due to the absense of expensive working parts, the only problem and expense being incurred in fixing the steel spheres, when a plurality employed, at the required distance from each other, for accomplishing which I have devised expedients. It will be understood that by immovability I mean lack of operation or adjustment when in practical use, and I do not mean that the spheres are to be undetachable; in some cases I would prefer to have them detachable. A further advantage involved when all the gaging parts or spheres have immovable relation to each other, is the ease of standardization of the gage. In an ordinary caliper gage it is quite difficult to produce an absolute parallelism between the jaw surfaces, and the slightest strain put upon any of the parts will throw these surfaces out of parallelism and at once destroy the accuracy of the gage, to restore which is a very delicate piece of work, usually quite beyond the capacity of the ordinary mechanic and those not in command of special facilities. With, however, the preformed steel spheres for gaging parts the contrary is true, and when for any reason whatsoever the size has been lost it may be restored by a simple bending of the support until the balls will again properly accord with a test or master gage; there is no question of restoring parallelism as it is entirely unimportant how the supporting parts themselves may twist or wind, and the ball having only a single point of contact all of the difficulties due to width and length of surface contact are done away with.

Coming now to the narrower aspect or phase of my invention, namely, that to which the drawings forming a part hereof are confined, it may be seen to consist of the application of my broad invention to that kind of gage known as a plug gage for measuring internal dimensions or the diameters of bores, and the invention in this specific view may be stated as consisting of a gaging system comprising a graduated set of preformed hardened steel balls of the kind manufactured for ball bearings, the same being scientifically measured and sorted out to afford an increasing series of sizes, in combination with a set of supports or handles therefor; each of said balls with its support being immovably connected together. This plug gage embodiment of my invention will be seen to possess all of the many important advantages and functions hereinabove recited. In addition this novel plug gage has superlative advantages with respect to gaging interior dimensions such as the diameters of bores. The steel ball of this gage will find inaccuracies in the hole to be explored that the ordinary cylindrical plug gage is unable to detect. This is because the ball can follow the changes in outline of the hole, since it measures successive diameters, whereas a cylindrical gage owing to its substantial length is able only to measure minimum diameters. It is understood that a plug gage is supposed to be of the same diameter as the bore it is to measure. It is quite conceivable that a cylindrical gage which is for example .001 inch smaller than the actual diameter of a hole could not be passed through that hole if the latter were at all winding or irregular. My novel gage on the contrary, however, would pass through that hole even though it were only .0001 inch smaller than the hole itself. My novel plug gage is very convenient for verifying bores, as owing to the spherical shape the ball will enter the bore whether or not the handle be held accurately in an axial direction; and in fact the ability of the handle to vary in this respect results in the measuring being accomplished not always at the same circumference so that the wear, slight though it is, is distributed over several circumferences, thus prolonging the accuracy and life of the gage. Another advantage inhering in my novel plug gage is that any general bending or change of shape in the gage as a whole makes absolutely no difference, whereas with a cylindrical gage the very smallest amount of curvature would render it practically useless.

Besides the specific embodiments contained in the drawings hereof showing my broad invention, the latter is susceptible of embodiment in other forms of gages such as caliper gages or those in which two properly positioned spheres operate in mutual conjunction for testing either interiors or exteriors; and such other embodiments while not to be specifically described, illustrated or claimed herein, I particularly reserve and set aside to constitute the subject matter of other applications to be filed by me.

I will now describe several instances of the kind of gage herein referred to as a plug gage embodying both the broad and specific characteristics of the present invention, and will then point out the novel features in the claims.

In the drawings accompanying this specification and forming a part of the same, Figure 1 is a side view of a plug gage embodying my invention and comprising a preformed hardened spherical steel ball immovably attached to a supporting handle; Fig. 2 is a cross-section of the gage shown in Fig. 1, and also the cross-section of a supposed object whose bore is being gaged; Fig. 3 is an end view of the gage of Figs. 1 and 2 from the ball end thereof; Fig. 4 shows a variation wherein two balls are connected to a single support, the balls of different sizes, enabling the same to be used as a tolerance gage for gaging bores; Fig. 5 shows a supplementary detail in the way of a separable handle, the part which is directly connected to the ball being capable of unscrewing from the handle proper; Fig. 6 is a variation of the gage shown in Fig. 4 with respect to the positions of the two balls, and this figure also shows a supplementary idea in the separation of the balls from each other by means of the separation of the support at an intermediate point; Fig. 7 shows an adjunct which forms no special part of the present invention but is in the nature of an insertion by which the gage in Fig. 6 may be made longer by, for example, the extent of one inch or other predetermined substantial amount; Figs. 8 and 9 show a special application of the present invention wherein the steel ball while immovable with respect to its handle is so secured thereto that when desired it may be detached; and Fig. 10 shows a series or set of gages of the same nature as Figs. 1 to 3 above, graded in diameter from one-half to one inch, there being a separate gage for each variation of a sixteenth of an inch within those limits, and the inclosure for the gages as well as the gages themselves may have the proper fractions or numbers designating their respective sizes. Fig. 11 shows in central cross-section an illustration of a modification combining the features illustrated in Figs. 4 and 9, producing a tolerance gage in which the balls are detachably secured to the handles. Fig. 12 is a left hand view of the gage of Fig. 11.

Figs. 1, 2, 3 and 10, represents preformed hardened steel balls. In accordance with this embodiment of my invention the support for the ball A is in the nature of a handle B which at $b$ may have a numerical indication or marking of the size of the gage or the function it is to perform. The ball A and support B are to be immovably connected together, and this will preferably be done by means of a low fusing solder, a soft cement or the like. When secured together A and B form a complete and permanent gage which may be one of such a system as is indicated in Fig. 10. In addition to or in place of marking its size upon the support B, I may indicate the size, preferably by etching, upon the ball itself but at a location which corresponds neither with the extreme front or center of the ball, nor any of the circumferences that are likely to take part in the measurement of a bore.

C, Fig. 2, indicates any article with a hole bored therein, and this figure indicates the gage as exploring and determining the correctness of the diameter of the bore throughout its extent. This gage can be varied or supplemented for use as a tolerance gage in the manner indicated in Fig. 4, in which A' indicates the first steel sphere and B' its support, there being a second and slightly larger sphere $A^2$ beyond which is a second support constituting a handle $B^2$. If now the spheres A' and $A^2$ differ from each other by, say, .002 of an inch a bore can be measured and determined with an accuracy equal to that difference, namely if the first or smaller sphere A' can be successfully passed into the bore where the larger sphere is unable to enter.

In Fig. 5 the sphere $A^4$ has an extremely short support $B^4$ and a removable handle D screwed into the rear of $B^4$, this obviously being a mere supplement to the gage seen in Fig. 1.

In Fig. 6 two spheres $A^5$ and $A^6$ are seen which may be so related as to constitute a tolerance gage in which case first one end and then the other would be tried upon the bore. Incidentally the supports $B^5$ and $B^6$ are separably connected as by a screw thread and it will be seen that each of the separated elements resembles the element $A^4 B^4$ of Fig. 5, so that an interchange of elements and handles is possible in accordance with the desires of the user.

As a mere incident and not intending to specifically patent the same herein, an expedient in the nature of an insert E, Fig. 7, is shown which may be inserted between the element $A^5 B^5$ on the one hand and $A^6 B^6$ on the other hand, so as to increase by a substantial amount such as an inch the fixed distance between the two spheres. This expedient would be useful for instance when the gage shown in Fig. 6 was employed not for determining bores, but as an end gage for determining lengths or the distances between two parts or surfaces.

In Figs. 8 and 9 instead of having the sphere cemented or soldered to its support, it is secured thereto in an immovable way by a device which nevertheless permits of detachment, which in some cases might be desirable. A circumferential groove is shown as having been ground around the ball $A^7$, namely at $f$, said groove of such a depth that a wire loop may be passed around the groove without projecting beyond the surface of the ball. F indicates a wire passed around said groove and having its ends extended into the interior of the support $B^7$ which is of a peculiar construction. Within said support are means for grasping and holding the wires permanently so as to render the sphere immovable with relation to the support. The support $B^7$ has a cylindrical hole within which a cylindrical plug $f'$ is inserted, this plug having lengthwise grooves for the wires, said grooves terminating in radial holes so that the wire ends can be bent radially inward to engage the holes. The wire ends and the plug being engaged and the plug being within the support $B^7$, said plug is engaged at the end farthest from the sphere by the screw shank of a headed screw $f^2$, the head of said screw abutting against the exterior end of the support $B^7$ and being screwed tightly into the plug F' to draw the latter and the wire tightly into place, thereby clamping the ball in its position as shown at the end of the support $B^7$.

Modifications of Figs. 11 and 12 will now be clearly understood. Two spheres of slightly different diameters $A^7$ and $A^8$ are detachably secured to their support or handle so as to serve as a tolerance gage. This is accomplished in the same manner as with Figs. 8 and 9, there being a wire F' engaging circumferential grooves in the respective spheres and engaging also in the plug $f'$ which is drawn by the screw $f^2$ into the handle portion B⁸ for rigidly tightening the parts. The handle or support in this embodiment consists of two portions B⁸ extending from the larger of the spheres A⁸, and a portion B⁷ extending between the spheres A⁷ and A⁸.

Not as an essential or important part of the invention hereinabove described, but merely as an incident, I mention the capability of element A⁴ B⁴, Fig. 5, serving as a height gage by being set on the flat end of the support as a base, in which case the distance between said flat end and the sphere surface would have to be exactly predetermined, which obviously would not interfere with the main functions already ascribed to those gages. This incidental use is analogous to that already referred to, shown in Fig. 6 as an end gage, which latter would rather come under the heading of those gages reserved for other applications of mine. While no claims herein will be directed to the article in Fig. 6 so far as its function of serving as an end gage is concerned, the same is useful herein as illustrating an embodiment of the broad invention hereof, it being of that species of the broad invention in which the gage is produced by the scientific attachment of a plurality of balls to one support and at a given exact distance from each other for the purpose of cooperating in measuring an inside or outside dimension or other size. With respect to this and with respect generally to the broad invention hereof, the following points are made as to the difference between my invention and gages that preceded it in the art; the advantages to be now referred to not having been previously herein recited. The employment of separate preformed hardened steel spheres permits all the remainder of each gage to be made of soft metal, which therefore further reduces first cost as compared with other gages. Most kinds of gages are exceedingly difficult and costly pieces of work to produce. Moreover owing to such use of soft metal there will be a total absence of various stresses that are set up when the entire instrument has be hardened, or when its ends only have to be hardened. Where the entire gage is hardened the changes in length due to the gradual relief of internal strain are very pronounced, since not only do these strains produce a direct change in size or length, but also a more or less pronounced change in shape, such as to distort the gage and thereby further cause length or size changes. All of which is overcome by my taking appropriate preformed prehardened steel spheres and immovably attaching them to soft metal supports.

In using the terms "ball" and "sphere" I do not exclude a preformed ball or sphere that has had its surface or body partly removed by being machined or otherwise, so long as sufficient of the sphere remains intact to perform the gaging functions that my invention contemplates.

In the claims the term "gaging contacts" or like term will be used to denote the contact point or points or lines at which the gage contacts the object being gaged; in my gages there is no contact at surfaces, but substantially only at points and lines. And the spheres will be referred to as affording all these gaging contacts, as distinguished from having some of the contacts consist of a part other than the spheres, which would be excluded from my invention.

What I claim as new and desire to secure by Letters Patent is:

1. As an article of manufacture a fixed dimension plug gage for exact machine requirements and uses comprising in combination, a handle, a sphere of known diameter and a contrivance for immovably but detachably connecting said sphere and handle together, whereby spheres of different sizes may be interchanged in use with said handle, and each sphere being etched upon its surface with an indication of its own diameter.

2. The gage comprising at least one sphere affording all the gaging contacts of the gage in combination with a support and a member adapted to engage around the sphere beneath its surface for immovably but detachably connecting said sphere to said support.

3. A gage comprising at least one sphere affording all the gaging contact of the gage, in combination with a support, and means for immovably but detachably connecting the support to a sphere; said connecting means comprising a wire engaged around the sphere beneath its surface, and a wire clamping device on said support.

4. As an article of manufacture a tolerance gage having at one extremity a gaging sphere, and at its other extremity a handle part, and at a point intermediate its extremities a second gaging sphere having a slightly different dimension from the first.

5. As an article of manufacture a tolerance gage having at one point at least one gaging sphere, and at a second point at least one gaging sphere adapted to determine a dimension slightly different from that at the first point, a part extending between the several spheres for connecting them, and a part adapted to serve as a handle; said spheres and said two parts being mutually attachable and detachable.

6. As an article of manufacture a tolerance gage having at one point at least one gaging sphere, and at a second point at least one gaging sphere adapted to determine a dimension slightly different from that at the first point, a part extending between the several spheres for connecting them, and a part adapted to serve as a handle, said handle part being connected to a sphere or spheres at a separate point from the first named part; and a single means for detachably securing together said parts and spheres.

7. As an article of manufacture a tolerance gage having at one extremity a gaging sphere, and at its other extremity a handle part, and at a point intermediate its extremities a second gaging sphere having a slightly different dimension from the first; and means for detachably securing together said spheres and handle.

8. As an article of manufacture a tolerance gage having at one extremity a gaging sphere, and at its other extremity a handle part, and at a point intermediate its extremities a second gaging sphere having a slightly different dimension from the first; and a clamping wire for detachably securing together said spheres and handle.

In testimony whereof I affix my signature in presence of two witnesses.

HENRY HESS.

Witnesses:
  GEORGE M. HENRIE,
  MARY M. CALLA.